United States Patent
Wiater

(10) Patent No.: US 10,386,001 B2
(45) Date of Patent: Aug. 20, 2019

(54) MULTIPLE FIELD DEVICE FLANGE

(71) Applicant: Rosemount Inc., Shakopee, MN (US)

(72) Inventor: Nathan Len Wiater, Victoria, MN (US)

(73) Assignee: ROSEMOUNT INC., Shakopee, MN (US)

( * ) Notice: Subject to any disclaimer, the term of this patent is extended or adjusted under 35 U.S.C. 154(b) by 432 days.

(21) Appl. No.: 14/672,714

(22) Filed: Mar. 30, 2015

(65) Prior Publication Data

US 2016/0290544 A1    Oct. 6, 2016

(51) Int. Cl.
| | |
|---|---|
| *G01D 11/30* | (2006.01) |
| *F16L 39/00* | (2006.01) |
| *G01L 19/00* | (2006.01) |
| *F16L 23/00* | (2006.01) |
| *F16L 41/00* | (2006.01) |

(52) U.S. Cl.
CPC ............. *F16L 39/00* (2013.01); *F16L 23/006* (2013.01); *G01D 11/30* (2013.01); *G01L 19/0007* (2013.01); *F16L 41/008* (2013.01)

(58) Field of Classification Search
CPC ...... G01L 19/0007; G01D 11/30; F16L 41/03; F16L 41/008
USPC ...................................................... 285/124.5
See application file for complete search history.

(56) References Cited

U.S. PATENT DOCUMENTS

| | | | |
|---|---|---|---|
| 2,203,357 A | 6/1940 | Kerr | |
| 2,871,881 A * | 2/1959 | Hewson | G01L 19/0015 |
| | | | 137/340 |
| 3,509,904 A * | 5/1970 | Olson | F16L 41/03 |
| | | | 137/269 |
| 3,869,920 A * | 3/1975 | Miyauchi | G01F 23/164 |
| | | | 73/722 |
| 4,082,324 A * | 4/1978 | Obrecht | F16L 39/00 |
| | | | 285/364 |

(Continued)

FOREIGN PATENT DOCUMENTS

| | | |
|---|---|---|
| EP | 1 898 187 | 12/2008 |
| FR | 2727560 A1 | 5/1996 |

(Continued)

OTHER PUBLICATIONS

Office Action from United States Patent Office, U.S. Appl. No. 14/672,681, dated Dec. 28, 2016, 10 pages.

(Continued)

*Primary Examiner* — David Bochna
(74) *Attorney, Agent, or Firm* — Westman, Champlin & Koehler, P.A.

(57) ABSTRACT

A flange for process field devices includes a first end, a second end, and a first mounting area for mounting a first field device between the first end and the second end. The first mounting area has a first device port positioned in the first mounting area to allow fluid communication with the first field device. A second mounting area on the flange is for mounting a second field device between the first end and the second end. The second mounting area has a second device port positioned in the second mounting area to allow fluid communication with the second field device. A connection port that provides fluid to the flange is located on the first end of the flange. An internal chamber fluidly connects the connection port to the first device port and the second device port.

15 Claims, 18 Drawing Sheets

(56) References Cited

U.S. PATENT DOCUMENTS

| | | | |
|---|---|---|---|
| 4,111,056 A * | 9/1978 | Mastromatteo | G01L 19/0618 137/557 |
| 4,163,395 A * | 8/1979 | Medlar | G01L 9/0054 73/708 |
| 4,285,244 A * | 8/1981 | Green | G01L 13/025 73/706 |
| 4,319,492 A * | 3/1982 | Hewson | G01L 19/0015 73/756 |
| 4,356,147 A | 10/1982 | Borrman et al. | |
| 4,466,290 A * | 8/1984 | Frick | G01L 19/0038 73/718 |
| 4,722,228 A | 2/1988 | Awa et al. | |
| 4,798,089 A * | 1/1989 | Frick | G01L 9/0072 73/706 |
| RE34,610 E | 5/1994 | Miller et al. | |
| 5,494,071 A * | 2/1996 | Bell | G01L 19/0007 137/597 |
| 5,655,560 A * | 8/1997 | Kedar | F16K 11/22 134/166 C |
| 5,763,787 A | 6/1998 | Gravel et al. | |
| 5,765,436 A | 6/1998 | Wilda et al. | |
| 5,811,690 A | 9/1998 | Hershey | |
| 5,988,203 A * | 11/1999 | Hutton | G01L 19/0015 137/271 |
| 6,000,427 A * | 12/1999 | Hutton | F16K 27/003 137/597 |
| 6,675,658 B2 | 1/2004 | Petrich et al. | |
| 6,832,788 B2 * | 12/2004 | Fukano | F16L 41/03 285/124.4 |
| 7,258,017 B1 | 8/2007 | Hedtke | |
| 7,412,893 B2 | 8/2008 | Hedtke | |
| 7,454,975 B2 | 11/2008 | Louwagie et al. | |
| 7,937,989 B2 * | 5/2011 | Marchesi | G01L 19/04 73/299 |
| 8,234,927 B2 * | 8/2012 | Schulte | G01L 9/0072 73/718 |
| 8,720,277 B2 | 5/2014 | Norberg et al. | |
| 9,274,018 B2 | 3/2016 | Miller et al. | |
| 9,816,889 B2 * | 11/2017 | Grimes | G01L 19/0618 |
| 2005/0082828 A1 | 4/2005 | Wicks et al. | |
| 2005/0126296 A1 | 6/2005 | Hedtke | |
| 2005/0210998 A1 | 9/2005 | Dimarco et al. | |
| 2005/0225035 A1 | 10/2005 | Sundet | |
| 2005/0247359 A1 * | 11/2005 | Hiser | F16L 41/03 137/879 |
| 2007/0062306 A1 | 3/2007 | Morrison et al. | |
| 2007/0272027 A1 | 11/2007 | Hedtke | |
| 2008/0053255 A1 | 3/2008 | Furey et al. | |
| 2008/0245152 A1 * | 10/2008 | Louwagie | G01L 19/04 73/706 |
| 2010/0083768 A1 | 4/2010 | Hedtke et al. | |
| 2013/0070889 A1 | 3/2013 | Iseda et al. | |

FOREIGN PATENT DOCUMENTS

| | | | |
|---|---|---|---|
| FR | 2794778 A1 * | 12/2000 | F16L 41/03 |
| GB | 1022816 A * | 3/1966 | F16L 41/03 |
| GB | 2 299 841 | 10/1996 | |
| JP | 10-510358 | 10/1998 | |
| JP | 2010-523975 | 7/2010 | |

OTHER PUBLICATIONS

Notification of Transmittal of the International Search Report and Written Opinion of the International Searching Authority from PCT/US2016/020563, dated Jun. 23, 2016.

Rolls-Royce Civil Nuclear: "Nuclear pressure transmitters Series 6000 Bibloc—Datasheet", Nov. 16, 2010 (Nov. 16, 2010), XP055279135, Retrieved from the Internet: URL:http://www.rolls-royce.com/~/media/Files/R/Rolls-Royce/documents/customers/nuclear-pressure-transmitters-brochure-tcm92-50336.pdf [retrieved on Jun. 9, 2016].

Kang Lin et al: "Pressure sensing line diagnostics in nuclear power plants 97 X Pressure sensing line diagnostics in nuclear power plants",, Jun. 26, 2012 (21012-06-26), XP0552979726, Retrieved from the Internet: URL:http://cdn.intechopen.com/pdfs/11567/InTech-Pressure_sensing_line_diagnostics_in_nuclear_power_plants.pdf [retrieved on Jun. 10, 2016].

H M Hashemian: "IAEA-CN-164-7S05 On-Line Monitoring and Calibration Techniques in Nuclear Power Plants",, Oct. 15, 2010 (Oct. 15, 2010), XP055279768, Retrieved from the Internet: URL:http://www-pub.iaea.org/mtcd/publications/pdf/p1500_cd_web/htm/pdf/topic7/7s05_h.hashemian.pdf [retrieved on Jun. 10, 2016].

Notification of Transmittal of the International Search Report and the Written Opinion of the International Searching Authority for PCT/US2016/021660, dated Jun. 14, 2016.

Notification of Transmittal of the International Search Report and the Written Opinion of the International Searching Authority from PCT/US2013/037967, dated Oct. 23, 2013.

Invitation to Pay Fees from PCT/US2013/037967, dated Apr. 24, 2013.

Office Action from European Patent Application No. 16711093.1 dated Nov. 10, 2017.

Office Action from European Patent Application No. 16713169.7 dated Nov. 10, 2017.

Office Action dated Jun. 8, 2017, from the United States Patent and Trademark Office for corresponding U.S. Appl. No. 141672.681, dated Jun. 8, 2017.

Office Action from Chinese Patent Application No. 201510459500.6, dated Oct. 17, 2018.

Office Action from Chinese Patent Application No. 201510459500.6, dated May 11, 2018.

Office Action from Russian Patent Application No. 2017135210, dated Jun. 19, 2018.

Office Action from Canadian Patent Application No. 2,981,369, dated Jul. 19, 2018.

Office Action from Japanese Patent Application No. 2017-551078, dated Dec. 12, 2018.

Office Action from Chinese Patent Application No. 201510459500.6, dated Apr. 8, 2019.

Office Action from Canadian Patent Application No. 2,981,369, dated Mar. 21, 2019.

Office Action from European Patent Application No. 16711093.1, dated Apr. 24, 2019.

* cited by examiner

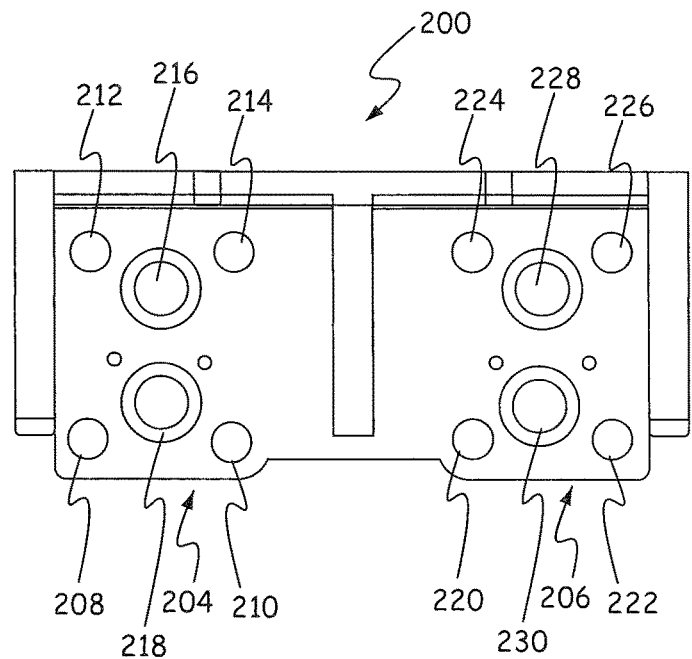
FIG. 4
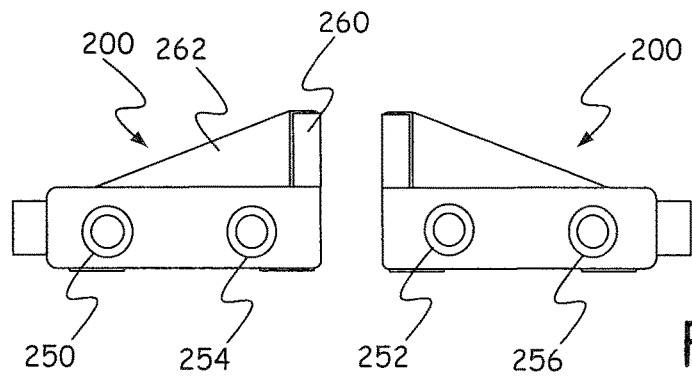
FIG. 5
FIG. 6

MULTIPLE FIELD DEVICE FLANGE

BACKGROUND

Embodiments described below relate to process field devices. In particular, the embodiments relate to flanges used to connect process field devices to a process.

Process measurement devices measure a state of a fluid in a process environment and transmit that state to a control station over either a wired or wireless connection. In some applications, the field device is directly fluidically coupled to the process fluid such that the process fluid itself contacts a portion of the field device. In other applications, the field device is indirectly fluidically coupled to the process fluid by a remote seal that uses an intermediate fill fluid to transmit a pressure from the process fluid to the field device. Some field devices only require a single fluidic connection to the process fluid while others, such as differential pressure sensors, require two separate fluidic connections to the process fluid.

The process fluid or the fill fluids are generally provided to the field device by piping that connects to the field device through a flange. The flange includes a connection port that receives the piping, an internal chamber in fluidic communication with the connection port, and a device port in fluidic communication with the internal chamber and positioned within a mounting area that receives the field device such that fluid in the piping reaches the field device. The flange can also include an additional venting port that is connected to the internal chamber and is used to vent the pressure in the internal chamber. In applications where a field device requires two separate connections, two separate device ports are provided on the flange and the field device is mounted over both device ports. Each device port in the flange is connected by a respective internal chamber to a respective connection port and the two connection ports are connected to two separate piping assemblies.

In some systems, the flange takes the form of a valve manifold that includes one or more valves to control the flow of fluid within the flange. In particular, valves can be provided to close the fluidic connection to the piping ports and separate valves can be provided to close the fluidic connection to the venting ports. In addition, a mixing valve can be provided that will connect the two chambers of a multi-chamber flange together.

The discussion above is merely provided for general background information and is not intended to be used as an aid in determining the scope of the claimed subject matter. The claimed subject matter is not limited to implementations that solve any or all disadvantages noted in the background.

SUMMARY

A flange for process field devices includes a first end, a second end, and a first mounting area for mounting a first field device between the first end and the second end. The first mounting area has a first device port positioned in the first mounting area to allow fluid communication with the first field device. A second mounting area on the flange is for mounting a second field device between the first end and the second end. The second mounting area has a second device port positioned in the second mounting area to allow fluid communication with the second field device. A connection port that provides fluid to the flange is located on the first end of the flange. An internal chamber fluidly connects the connection port to the first device port and the second device port.

A manifold for process transmitters has a first internal chamber and a second internal chamber, separate from the first internal chamber. A first device port is in fluid communication with the first internal chamber and a second device port is in fluid communication with the second internal chamber, wherein the first and second device ports are positioned to be covered by a first process transmitter when the first process transmitter is mounted on the manifold. A third device port is in fluid communication with the first internal chamber and a fourth device port is in fluid communication with the second internal chamber, wherein the third and fourth device ports are positioned to be covered by a second process transmitter when the first process transmitter is mounted on the manifold.

A process field device assembly includes a flange, a first process field device and a second process field device. The flange has a connection port with an axis wherein the connection port is in fluid communication with an internal chamber in the flange. The first process field device is mounted to the flange such that the first process field device is in fluid communication with the internal chamber in the flange and the axis of the connection port extends parallel to a mounting surface of the first process field device. The second process field device is mounted to the flange such that the second process field device is in fluid communication with the internal chamber in the flange and the axis of the connection port extends parallel to a mounting surface of the second process field device.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

BRIEF DESCRIPTION OF THE DRAWINGS

FIG. 4 is a top view of the flange of FIG. 2.

FIG. 5 is a right side view of the flange of FIG. 2.

FIG. 6 is a left side view of the flange of FIG. 2.

DETAILED DESCRIPTION OF ILLUSTRATIVE EMBODIMENTS

In the embodiments below, flanges that can support multiple field devices, such as process transmitters, and that can distribute fluid from a connection pipe to multiple field devices are described.

Figure 1:
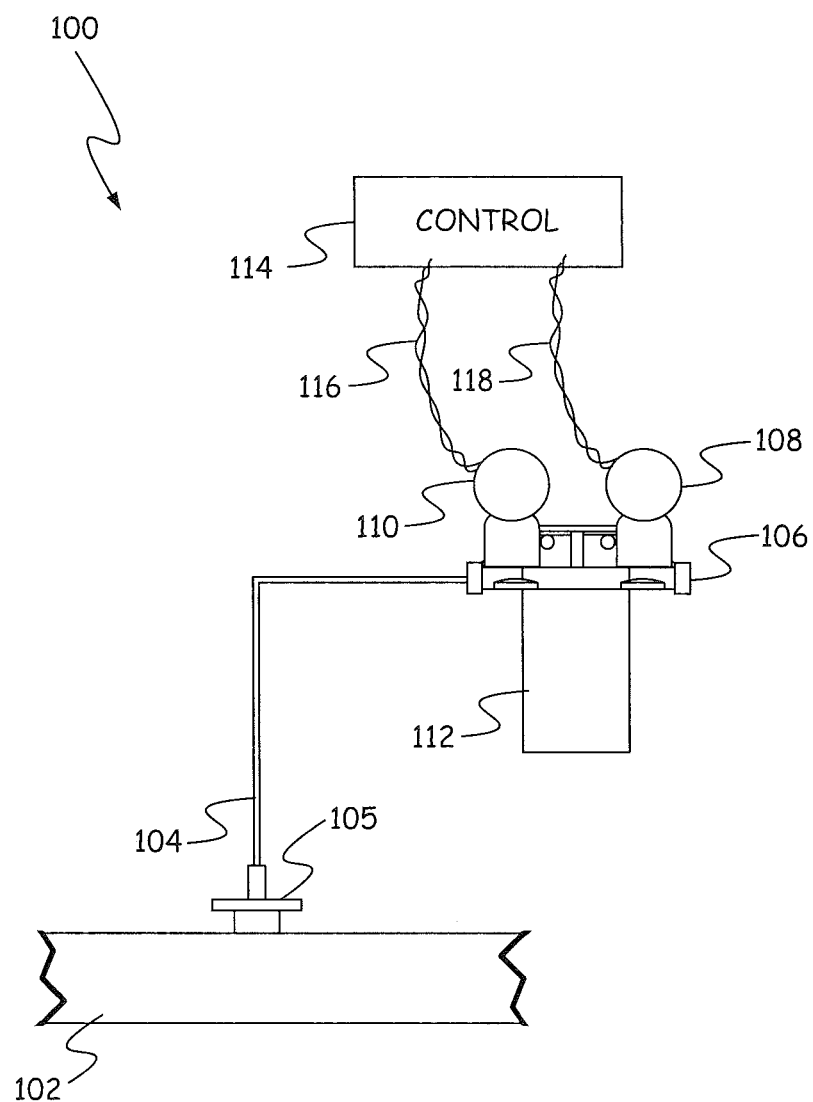
FIG. 1 is a diagram of a portion of a process environment.

FIG. 1 provides a diagram of a portion 100 of a process control environment. In FIG. 1, a conduit or container 102 contains a process fluid. Piping 104 is connected to conduit 102 by a connection housing 105 and carries a fluid that conveys a pressure or temperature of the process fluid in conduit 102. The fluid in piping 104 may be the process fluid itself or may be a fill fluid that is isolated from the process fluid by a diaphragm in connection housing 105. If piping 104 includes fill fluid, the diaphragm in housing 105 transmits the pressure of the process fluid in conduit 102 to the fill fluid. Piping 104 is connected to a flange 106 such that interior chambers within flange 106 are in fluidic communication with the interior of piping 104. As a result, fluid in flange 106 is at a same pressure and temperature as the fluid in piping 104. Flange 106 supports two field devices 108 and 110 and is supported by a structure 112. As described more fully below, within flange 106, chambers connect a connection port for piping 104 to separate openings for each of field devices 108 and 110 so that one or more sensing areas on field devices 108 and 110 are in fluidic communication with the fluid in piping 104.

Field devices 108 and 110 communicate with a control or monitoring station 114. In one embodiment, this communication is achieved through two-wire connections 116 and 118 with control station 114. Two-wire connections 116 and 118 carry both power and communication signals. In other embodiments, field devices 108 and 110 communicate with control station 114 using a wireless connection and a wireless protocol.

Figure 2:
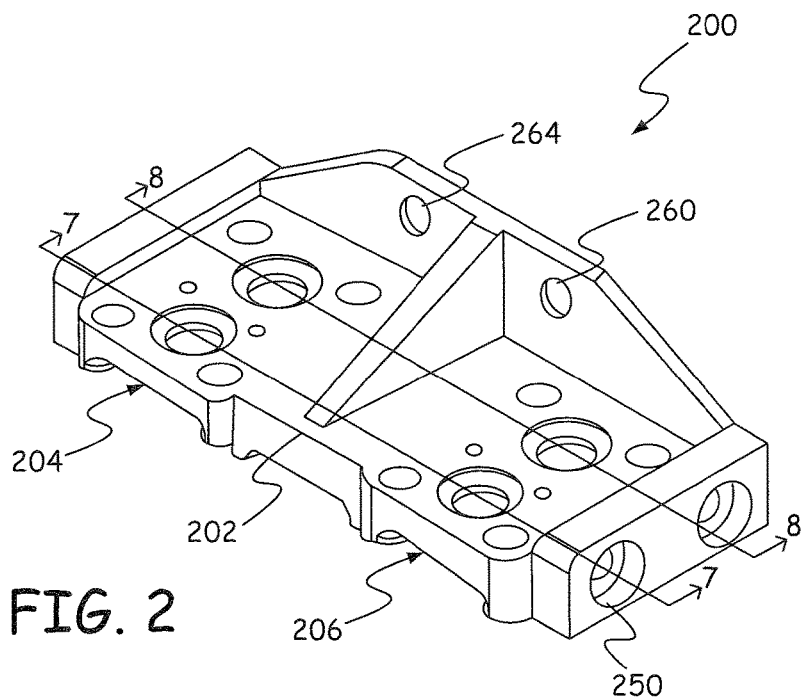
FIG. 2 is perspective view of a multiple field device flange in accordance with one embodiment.
Figure 3:
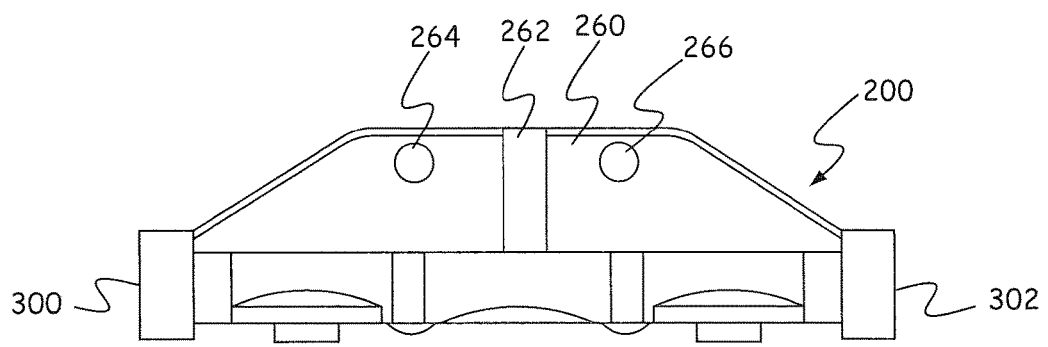
FIG. 3 is front view of the flange of FIG. 2.
Figure 7:
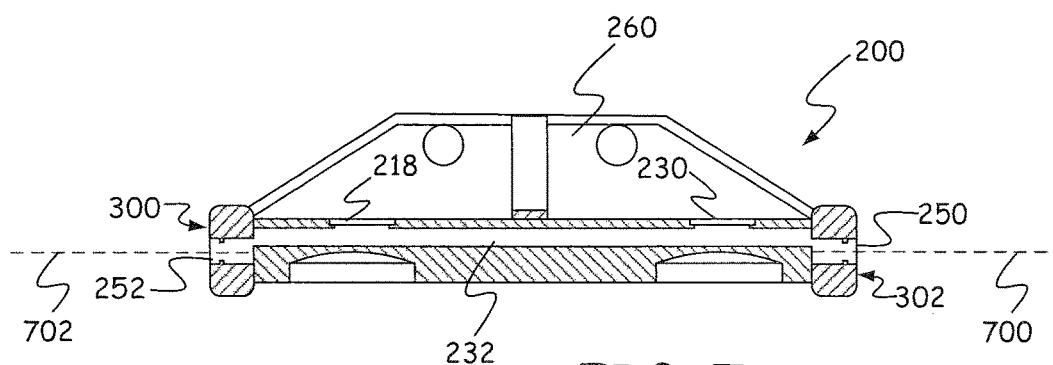
FIG. 7 is a first sectional view taken through lines 7-7 of FIG. 2.
Figure 8:
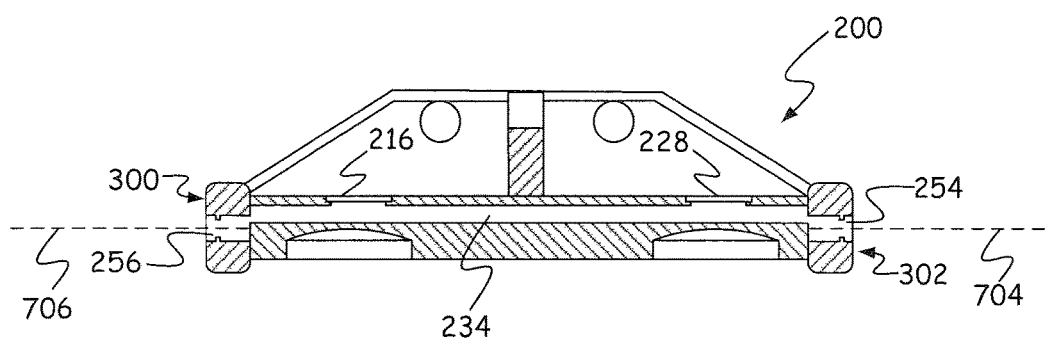
FIG. 8 is a second sectional view taken through lines 8-8 of FIG. 2.

FIG. 2 provides a perspective view of a multiple field device flange 200 that can be used as flange 106 in accordance with a first embodiment. FIGS. 3, 4, 5, and 6 provide a front view, top view, left view, and a right view, respectively, of flange 200. FIGS. 7 and 8 provide sectional views of flange 200 taken along lines 7-7 and 8-8, respectively, in FIG. 2.

In this embodiment, flange/manifold 200 includes a plate 202 having two mounting areas 204 and 206 on a same side of plate 202 between a first end 300 and a second end 302 of flange 200. Mounting area 204 includes mounting holes 208, 210, 212 and 214 (FIG. 4) and device ports 216 and 218. Device port 218 is in fluidic communication with an internal chamber 232 (FIG. 7) and device port 216 is in fluidic communication with an internal chamber 234 (FIG. 8). Mounting area 204 can receive a field device or transmitter such that a sensing surface, such as an isolation diaphragm, in the field device can be positioned directly over device port 216 and a second sensing surface, such as a second isolation diaphragm, in the field device can be positioned directly over device port 218. Bolts may then be passed through mounting holes 208, 210, 212 and 214 and corresponding mounting holes in the field device to mount the field device to mounting area 204. One or more gaskets may be used to seal around device ports 216 and 218 so that fluid does not flow between the device ports or between the field device and flange 200.

Mounting area 206 includes mounting holes 220, 222, 224, and 226 (FIG. 4) and device ports 228 and 230. Device port 230 is in fluidic communication with an internal chamber 232 (FIG. 7) and device port 228 is in fluidic communication with an internal chamber 234 (FIG. 8). Mounting area 206 can receive a second field device or transmitter such that a sensing surface, such as an isolation diaphragm, in the second field device can be positioned directly over device port 228 and a second sensing surface, such as a second isolation diaphragm, in the second field device can be positioned directly over device port 230. Bolts may then be passed through mounting holes 220, 222, 224 and 226 and corresponding mounting holes in the field device to mount the field device to mounting area 206. One or more gaskets may be used to seal around device port 228 and 230 so that fluid does not flow between the device ports or between the second field device and flange 200.

In one embodiment, internal chamber 232 thus fluidically connects device port 218 to device port 230 allowing two separate field devices to be in fluidic communication with each other. In addition, internal chamber 232 may connect to two connection ports 250 and 252 on respective ends 302 and 300 of flange 200. Connection ports 250 and 252 have respective axes 700 and 702 and are each capable of receiving a connection to piping carrying a process fluid or a fill fluid and thus provide fluidic communication between the fluid in the piping and internal chamber 232 and device ports 218 and 230. Each of connection ports 250 and 252 is also capable of being connected to a bleed valve or plug instead of piping. The bleed valve can be used to reduce the pressure in internal chamber 232 in a controlled manner.

As described above, internal chamber 234 fluidically connects device port 216 to device port 228 allowing two separate field devices to be in fluidic communication with each other. In addition, internal chamber 234 may connect to two connection ports 254 and 256 on respective ends 302 and 300 of flange 200. Connection ports 254 and 256 have respective axes 704 and 706 and are each capable of receiving a connection to piping carrying a process fluid or a fill fluid and thus provide fluidic communication between the fluid in the piping and internal chamber 234 and device ports 216 and 228. Each of connection ports 254 and 256 is also capable of being connected to a bleed valve instead of piping. The bleed valve can be used to reduce the pressure in internal chamber 234 in a controlled manner.

In this embodiment, flange 200 includes a back wall 260 that is supported by angle support wall 262. Angle support wall 262 extends from a front of plate 202 to a top of back wall 260. Back wall 260 includes two holes 264 and 266 for mounting flange 200 and the field devices supported by flange 200 to a support structure such as support structure 112 of FIG. 1. In particular, mounting bolts may be passed through mounting holes 264 and 266 and corresponding mounting holes in the support structure to mount flange 200 to the support structure.

Figure 9:
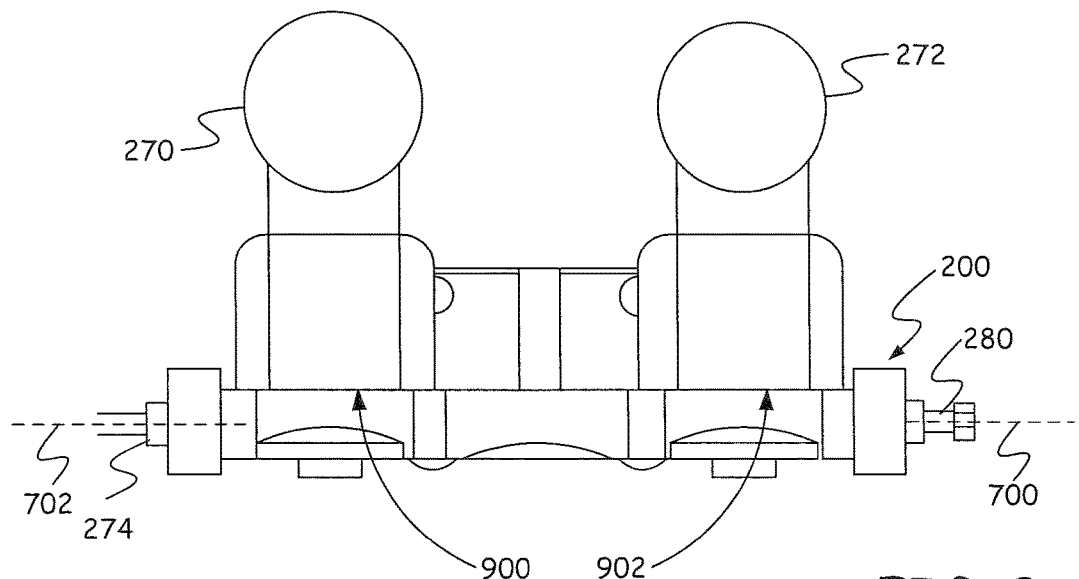
FIG. 9 is a front view of the flange of FIG. 2 with two field devices mounted thereon.
Figure 10:
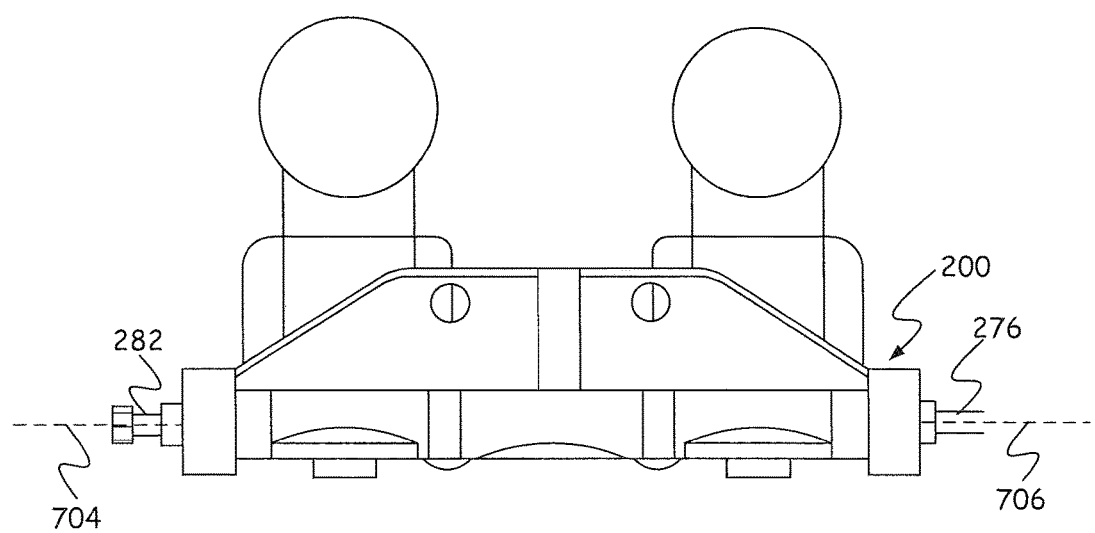
FIG. 10 is a back view of the flange of FIG. 2 with two field devices mounted thereon.

FIGS. 9 and 10 provide a front view and a back view of flange 200 with two field devices 270 and 272 mounted thereon. Piping 274 and piping 276 are connected to connection ports 256 and 252, respectively. Piping 274 carries a fluid that is in fluid communication with internal chamber 232 through connection port 252 and piping 276 carries a fill fluid that is in fluidic communication with internal chamber 234 through connection port 256. Thus, the fill fluid carried by piping 274 is in fluid communication with both field device 270 and 272 through internal chamber 232 and device ports 218 and 230 while the fluid in piping 276 is in fluid communication with field devices 270 and 272 through internal chamber 234 and device ports 216 and 228. Note that internal chambers 232 and 234 are separate in flange 200 and as such, the fluid in internal chamber 232 is not in fluidic communication with the fluid in internal chamber 234. In FIGS. 9 and 10, connection ports 252 and 256 have respective axes 702 and 706 that are parallel to respective mounting surfaces 900 and 902 on the bottoms of field devices 270 and 272. A mounting surface of a field device is a surface that faces and makes contact with the flange. Although two connection ports are shown for each internal chamber 232 and 234, it is appreciated that internal chambers 232 and 234 each need only one connection port and the two connection ports for each internal chamber are shown for convenience and are not necessary.

In FIGS. 9 and 10, two bleed valves 280 and 282 are provided with bleed valve 280 connected to port 250 and bleed valve 282 connected to port 254. Bleed valve 280 provides a means for reducing the pressure in internal chamber 232 in a controlled manner while bleed valve 282 provides a means for reducing the pressure in internal chamber 234 in a controlled manner.

Figure 11:
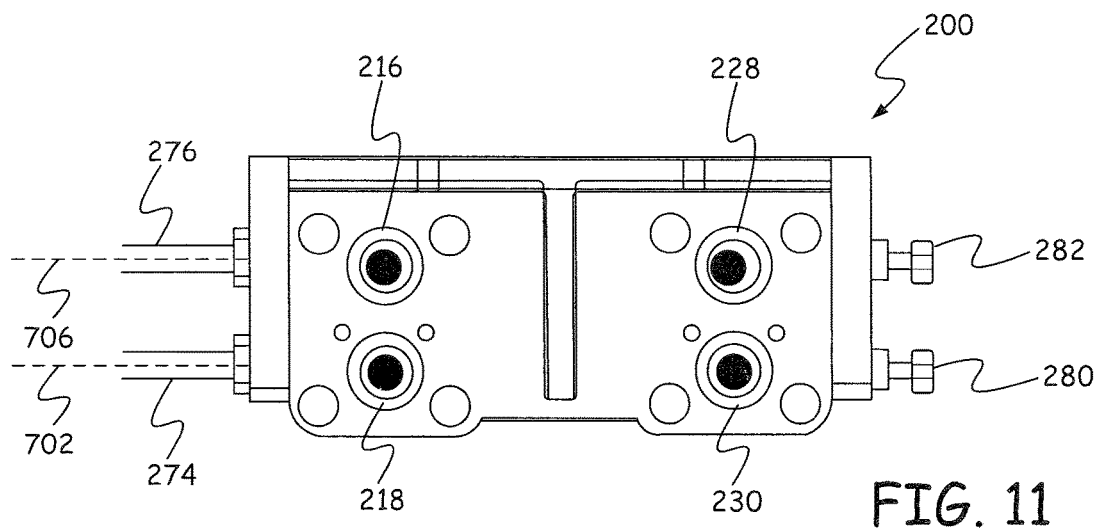
FIG. 11 is a top view of the flange of FIG. 2 showing connections for a differential pressure configuration.

FIG. 11 provides a top view of the embodiments of FIGS. 9 and 10 without field devices 270 and 272 present. The configuration shown in FIG. 11 allows for differential pressure measurements with piping 276 carrying a pressure from one location in the process fluid conduit and piping 274 carrying a second pressure from a second location in the process fluid conduit. Thus, device ports 216 and 228 provide a fluid with a pressure from one location in the process conduit and device ports 218 and 230 provide a pressure from a separate location in the process conduit. Field devices 270 and 272 can thereby provide two separate differential pressure readings across the same two locations in the process conduit. In accordance with one embodiment, field devices 270 and 272 are similar and thus provide redundant differential pressure measurements, which can increase safety in certain applications while maintaining accuracy by ensuring that each field device is measuring the differential pressure across the same two locations in the process conduit. The redundant differential pressure measurements can be used directly or can be used to determine a flow rate or a mass flow rate. In accordance with other embodiments, field device 270 has a different range than field device 272. For example, field device 270 can be a wide range field device and field device 272 can be a normal range field device. The signal from the normal range field device can be used when the sensed value is in a normal range and the signal from the wide range field device can be used when the sensed value is outside of the normal range.

Figure 12:
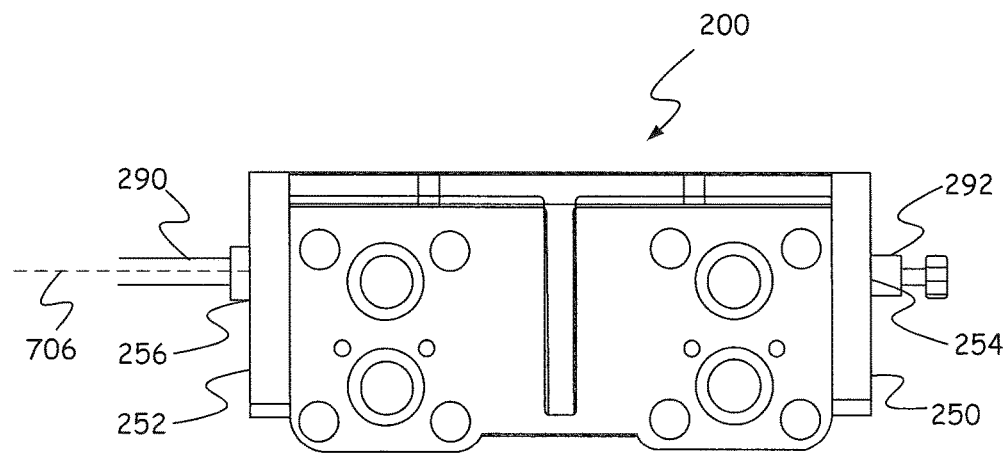
FIG. 12 is a top view of the flange of FIG. 2 showing connections for a gage pressure configuration.

FIG. 12 shows a top view of flange 200 with an alternate connection to the process conduit. In FIG. 12, connection port 256 is connected to piping 290 and connection port 254 is connected to bleed valve 292. Piping 290 is connected to the process conduit by either directly carrying process fluid from the process conduit or carrying a fill fluid that is isolated from the process fluid by an isolation diaphragm. Through connection port 256, internal chamber 234 is in fluidic communication with the fluid carried by piping 290 and device ports 216 and 228 are also in fluidic communication with the fluid carried by piping 290. Thus, the pressure or temperature of the process fluid can be communicated to both device ports 216 and 228 thus providing fluidic communication to two separate field devices. In FIG. 12, connection ports 252 and 250 are not connected to any piping or bleed valves but instead are vented to atmosphere. The connection configuration of FIG. 12 allows for a gage pressure measurement in which each field device provides a signal indicative of the pressure of the process fluid relative to atmosphere. In accordance with one embodiment, the connections shown in FIG. 12 allow for a redundant gage pressure measurement in which similar field devices each measure the gauge pressure of the process fluid at a same location in the process conduit. This redundant configuration can in some instances increase the safety of the operation while ensuring accurate pressure measurements by ensuring that each field device is measuring the pressure of the process fluid at the same location. In accordance with another embodiment, the connections shown in FIG. 12 are used with field devices that have different ranges or that measure different parameters. For example, two field devices with different sensing ranges are mounted to flange 200 in FIG. 12 in one embodiment. In another embodiment, one field device that senses gauge pressure and another field device that senses temperature are mounted to flange 200 in FIG. 12.

Figure 13:
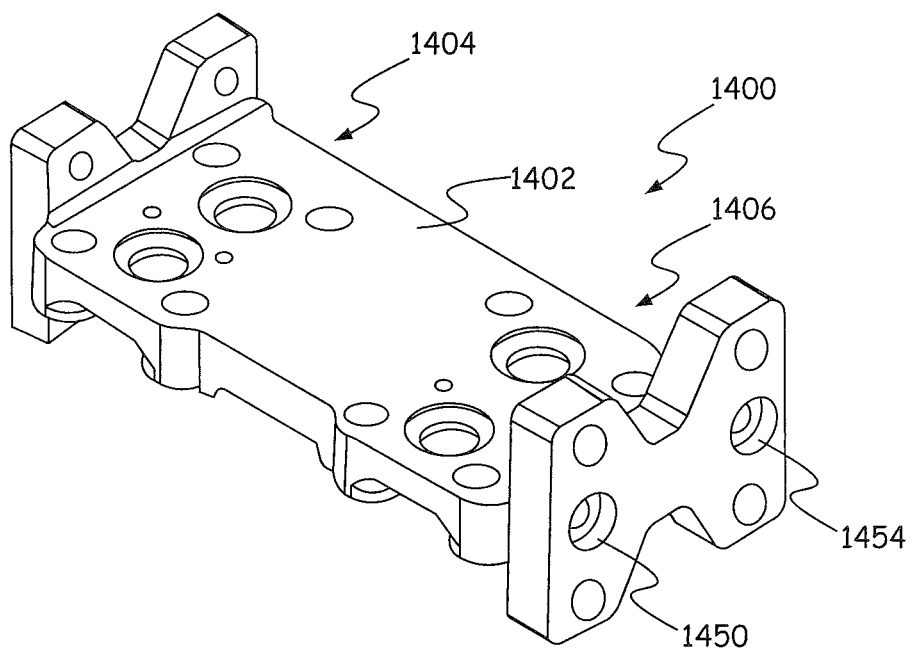
FIG. 13 is a perspective view of a multiple field device flange of a second embodiment.
Figure 14:
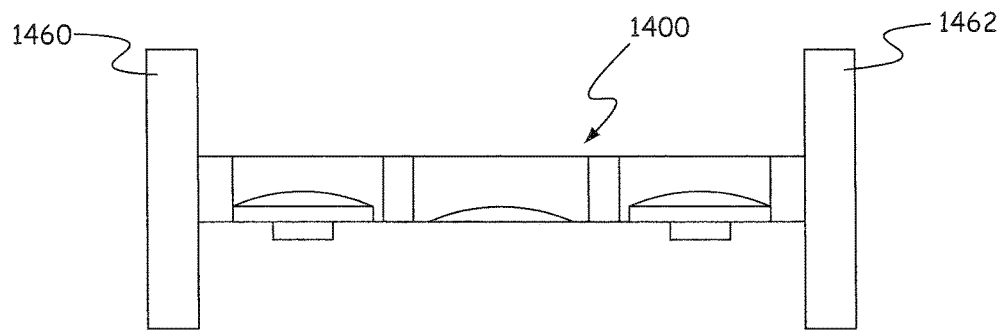
FIG. 14 is a front view of the flange of FIG. 13.
Figure 15:
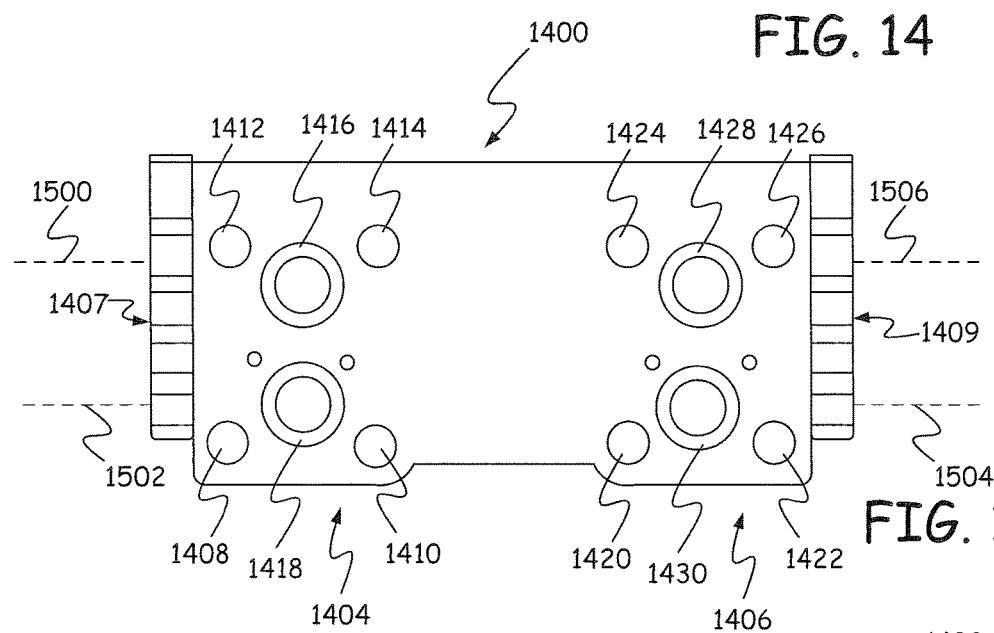
FIG. 15 is a top view of the flange of FIG. 13.
Figures 16, 17:
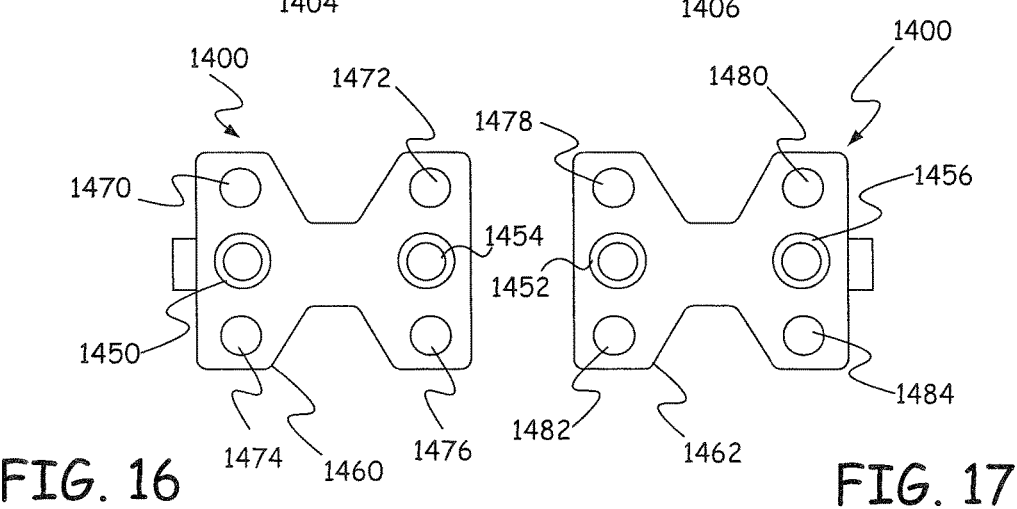
FIG. 16 is a right side view of the flange of FIG. 13.
FIG. 17 is a left side view of the flange of FIG. 13.

FIG. 13 provides a perspective view of a flange/manifold 1400 in accordance with a second embodiment. FIGS. 14, 15, 16, and 17 provide a front view, top view, left side view, and right side view, respectively, of flange 1400. Flange 1400 is similar to flange 200 but without back wall 260 or angle support wall 262. Flange 1400 includes a mounting plate 1402 having two mounting areas 1404 and 1406 positioned between a first end or side 1407 and a second end or side 1409. Mounting areas 1404 and 1406 are similar to mounting areas 204 and 206 of flange 200. In particular, mounting area 1404 includes mounting through holes 1408, 1410, 1412 and 1414 and device ports 1416 and 1418. Mounting area 1406 includes mounting holes 1420, 1422, 1424 and 1426 and device ports 1428 and 1430. Each of mounting areas 1404 and 1406 is capable of receiving a respective field device. A field device may be mounted to mounting area 1404 by passing connection bolts through mounting holes in the field device and through mounting holes 1408, 1410, 1412 and 1414. When mounted, the sensing areas, such as diaphragm seals, in the field device are aligned with device ports 1416 and 1418. One or more gaskets may be used between flange 1400 and the field device mounted to mounting area 1404 to seal around device ports 1416 and 1418 between the field device and flange 1400. Similarly, a field device may be mounted to mounting area 1406 by passing mounting bolts through mounting holes 1420, 1422, 1424 and 1426 and corresponding mounting holes in the field device. When a field device is mounted to mounting area 1406, sensing areas, such as diaphragm seals, are aligned with device ports 1428 and 1430. One or more gaskets may be used around device ports 1428 and 1430 to seal around the device ports between plate 1402 and the field device mounted to mounting area 1406.

In the embodiment, two connection ports 1452 and 1456 are provided on first end 1407 and two other connection ports 1450 and 1454 are provided on second opposite end 1409. Specifically, connection ports 1450 and 1454 are formed in a side or end connection wall 1460 while connection ports 1452 and 1456 are formed in a side or end connection wall 1462. Connection ports 1452 and 1456 have respective axes 1500 and 1502 while connection ports 1450 and 1454 have respective axes 1504 and 1506. Side connection wall 1460 includes mounting holes 1470, 1472, 1474 and 1476 that can be used to mount flange 1400 to a support structure. Side connection wall 1462 includes mounting holes 1478, 1480, 1482 and 1484 that can also be used to mount flange 1400 to a support structure.

Plate 1402 includes an internal chamber (not shown) that fluidically connects connection port 1450, connection port 1456, device port 1418 and device port 1430 together. Thus, each of connection port 1450, connection port 1456, device port 1418 and device port 1430 are in fluidic communication with each other. Plate 1402 includes a separate internal chamber (not shown) that connects connection port 1452, connection port 1454, device port 1416 and device port 1428 together such that each of these ports is in fluid communication with each other. Although two connection ports are shown for each internal chamber, it is appreciated that only a single connection port is required for each internal chamber and that two are shown for convenience but are not necessary.

Figure 18:
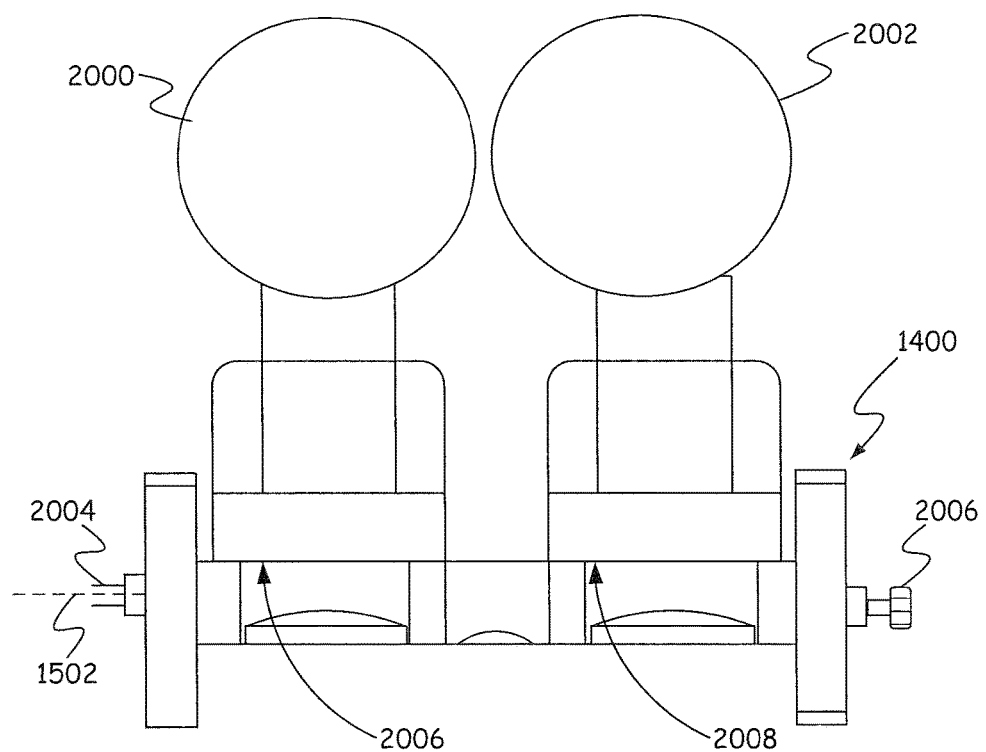
FIG. 18 is a front view of the flange of FIG. 13 showing two field devices mounted thereon.

FIG. 18 provides a front view of plate 1400 with two field devices 2000 and 2002 mounted thereon. In FIG. 18, piping 2004 is connected to connection port 1454 while separate optional piping (not shown) can be connected to connection port 1450. Piping 2004 and the optional piping that is not shown connect to the process conduit. In accordance with some embodiments, field devices 2000 and 2002 are similar and provided redundant measurements of one of a differential pressure, a gauge pressure and a temperature. In other embodiments, field devices 2000 and 2002 have different ranges or sense different parameters from each other. As shown in FIG. 18, the axes of the connection ports, such as axis 1502 of connection port 1454, is parallel to mounting surfaces 2006 and 2008 on field devices 2000 and 2002.

Figure 19:
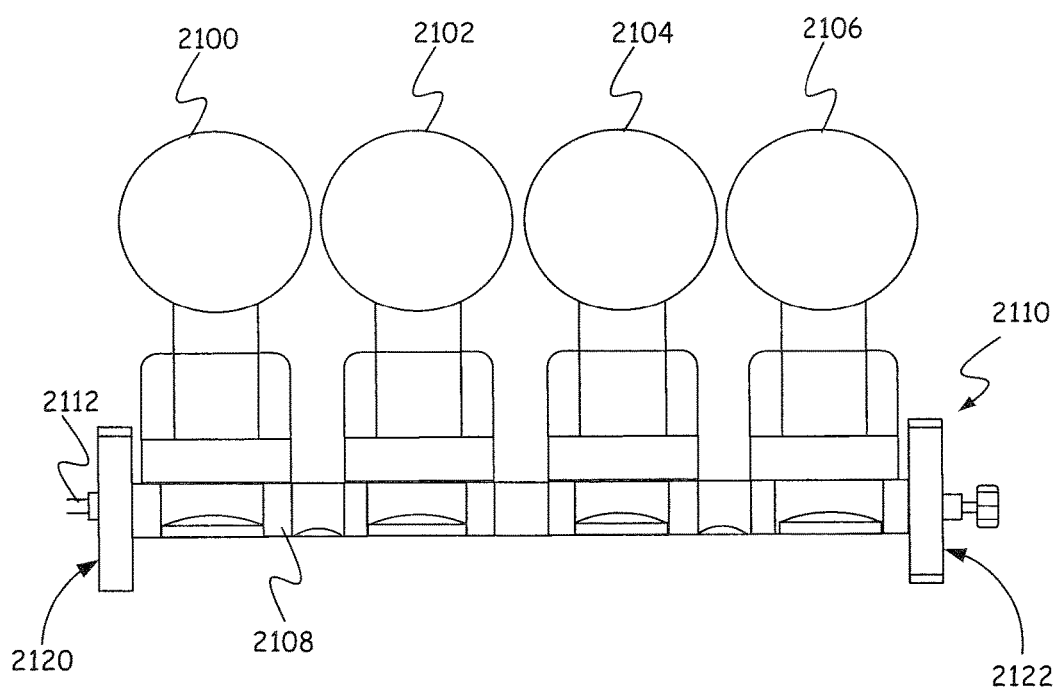
FIG. 19 is a front view of a flange with four field devices mounted thereon in accordance with a third embodiment.

FIG. 19 provides a front view of a further embodiment in which plate 1400 of FIG. 13 has been expanded to include two additional mounting areas such that four field devices 2100, 2102, 2104 and 2106 are mounted on a mounting plate 2108 of a flange 2110. Flange 2110 is similar to flange 1400 except that it includes two additional mounting areas between two opposing ends 2120 and 2122, where the two additional mounting areas are identical to mounting areas 1404 and 1406 of flange 1400. In flange 2110, an internal chamber connects four device ports to a side connection port on side or end 2120 and to another side connection port on side or end 2122. A second internal chamber connects four other device ports to a second side connection port on side 2120 and a second side connection port on side 2122. Piping 2112 is connected to one of the side connection ports on side 2120. Additional optional piping, not shown, may be connected to the other side connection port on side 2120. In accordance with one embodiment, field devices 2100, 2102, 2104 and 2106 are similar to each other and provide four-way redundancy in their measurements. In accordance with other embodiments, one or more of field devices 2100, 2102, 2104, and 2106 has a different measurement range or measures a different parameter of the process flow. For example, field devices 2100 and 2102 can provide a redundant gauge pressure measurement and field devices 2104 and 2106 can provide redundant temperature measurements. Alternatively, one or more of field devices 2100, 2102, 2104 and 2106 can provide a flow rate measurement and/or a mass flow rate measurement.

Figure 20:
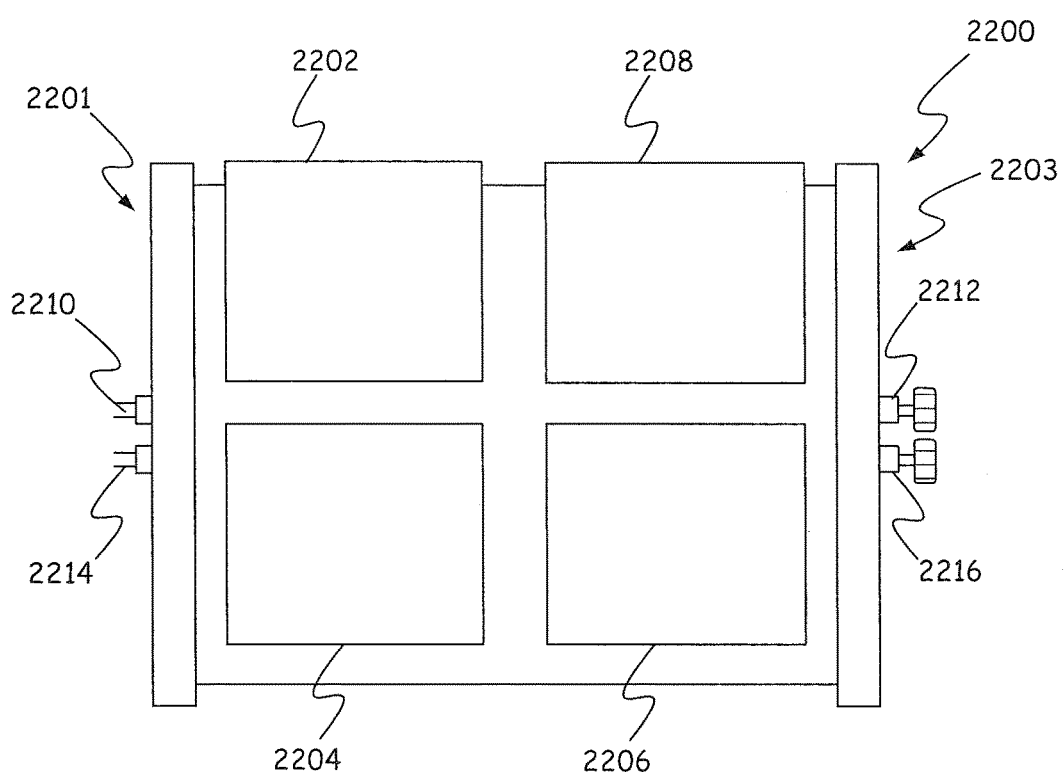
FIG. 20 is a top view of a flange with four field devices mounted thereon in accordance with a fourth embodiment.

FIG. 20 provides a top view of an additional embodiment in which flange 1400 has been altered to form a flange 2200 that can support four field devices 2202, 2204, 2206 and 2208 in a square configuration. Flange 2200 includes a separate mounting area for each field device where each mounting area is identical to mounting area 1404 of flange 1400. Thus, each mounting area includes four mounting holes and two separate device ports. Further, each field device 2202, 2204, 2206 and 2208 is mounted such that two sensing areas in each field device are aligned with separate respective device ports in their respective mounting area. Flange 2200 includes a first internal chamber that fluidically connects a side connection port on a first side or end 2201 to a side connection port on a second side or end 2203. In addition, the internal chamber fluidically connects the two connection ports to a respective device port in each mounting area of field devices 2202, 2204, 2206 and 2208. Thus, through the internal chamber, piping 2210 which is connected to a side connection port on side 2201 is in fluidic communication with a device port for each field device 2202, 2204, 2206 and 2208 and with a bleed valve 2212 connected to a side connection port on side 2203.

Flange 2200 includes a second internal chamber (not shown) that fluidically connects a second side connection port on side 2201 to a second side connection port on side 2203 and to respective device ports in the mounting areas of each field device 2202, 2204, 2206 and 2208. Thus, the second internal chamber fluidically connects piping 2214 that is connected to the second connection port on side 2201 to bleed valve 2216 connected to the second connection port on side 2203 and to each of field devices 2202, 2204, 2206 and 2208. In accordance with one embodiment, field devices 2202, 2204, 2206 and 2208 are similar to each other and provide four-way redundancy in their measurements. In accordance with other embodiments, one or more of field devices 2202, 2204, 2206, and 2208 has a different measurement range or measures a different parameter of the process flow. Alternatively, one or more of field devices 2202, 2204, 2206 and 2208 can provide a flow rate measurement and/or a mass flow rate measurement. Note that in other embodiments, piping 2214 is not present and the assembly of FIG. 20 provides a four-way redundant gauge pressure measurement.

Figure 21:
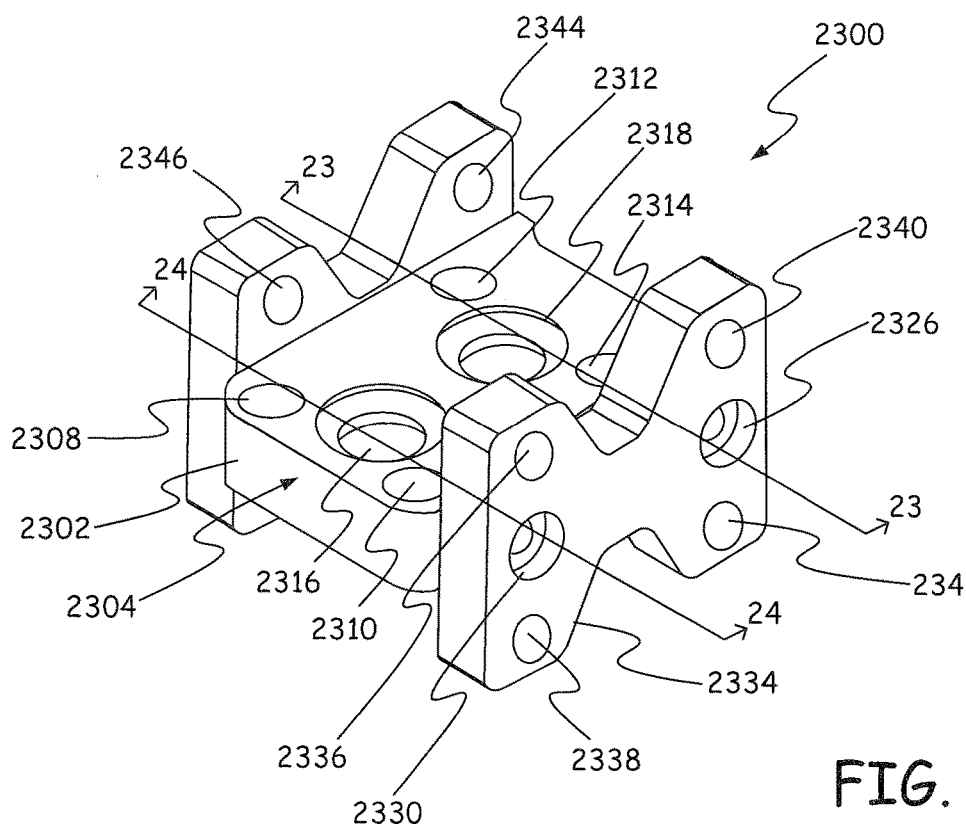
FIG. 21 is a top perspective view of a flange in accordance with a fifth embodiment.
Figure 22:
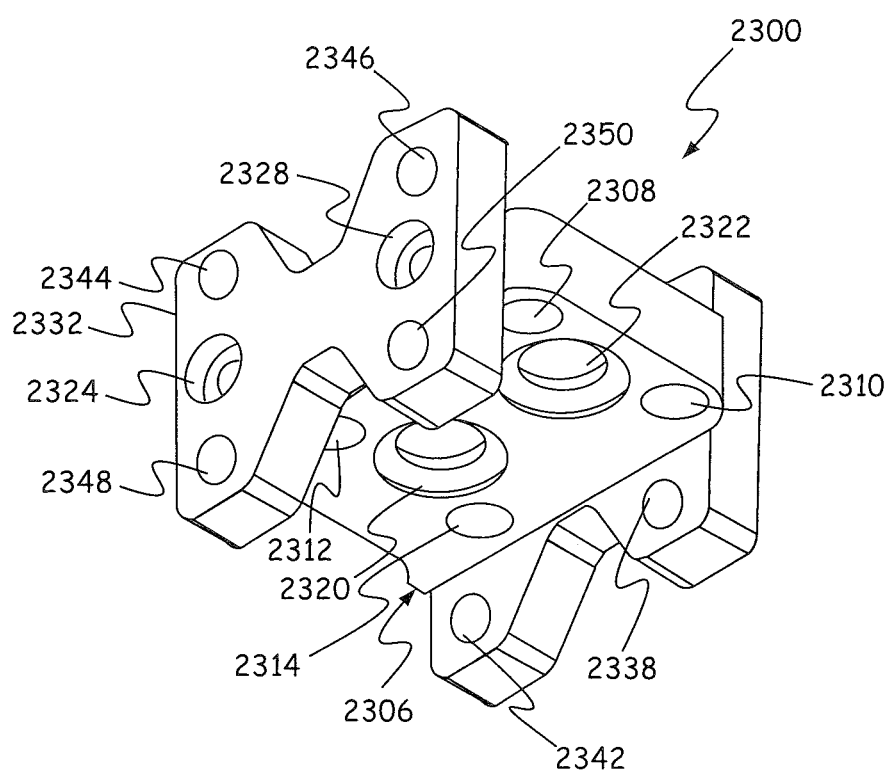
FIG. 22 is a bottom perspective view of the flange of FIG. 21.
Figure 23:
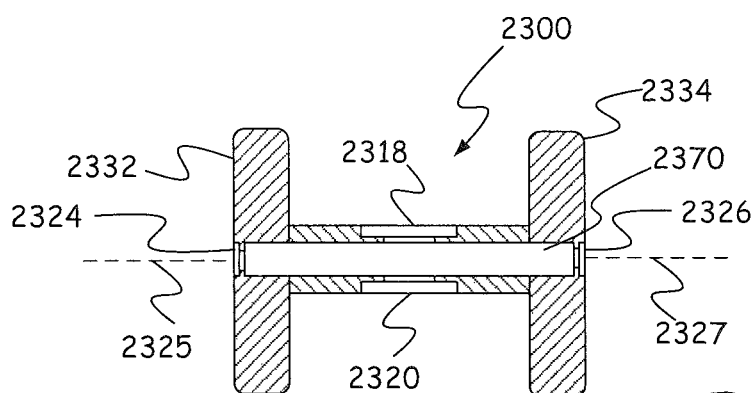
FIG. 23 is a first sectional view through lines 23-23 of FIG. 21.
Figure 24:
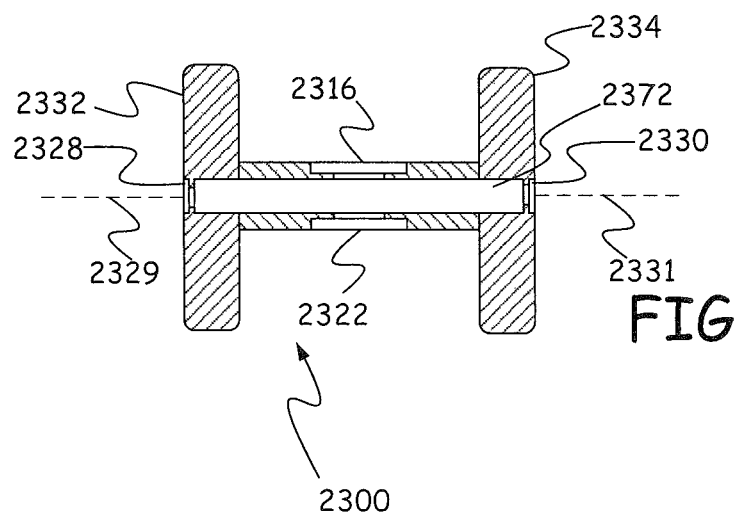
FIG. 24 is a second sectional view through lines 24-24 of FIG. 21.

FIGS. 21 and 22 provide a top perspective view and bottom perspective view of a flange/manifold 2300 under a further embodiment. FIGS. 23 and 24 provide sectional views of flange 2300 taken through lines 23-23 and 24-24 in FIG. 21.

Flange/manifold 2300 includes a plate 2302 having a top mounting area 2304 on a first side of plate 2302 and a bottom mounting area 2306 on a second side opposite the first side. Thus, mounting area 2304 is on a top of plate 2302 and mounting area 2306 is on a bottom of plate 2302. Plate 2302 includes four mounting holes 2308, 2310, 2312 and 2314. The mounting holes pass through plate 2302 such that mounting area 2304 and mounting area 2306 share the mounting holes. Since the mounting holes are shared, they are referred to as common mounting holes. It is possible to mount one field device to mounting area 2304 and a separate field device to mounting area 2306 using four mounting bolts that pass through mounting holes in each of the field devices and through common mounting holes 2308, 2310, 2312 and 2314.

Mounting area 2304 includes device ports 2316 and 2318 and mounting area 2306 includes device ports 2320 and 2322. A side wall or end wall 2332 includes connection ports 2324 and 2328 having respective axes 2325 and 2329. A side wall or end wall 2334 includes connection ports 2330 and 2326 having respective axes 2331 and 2327. Mounting areas 2304 and 2306 are between side walls 2332 and 2334. Each of distal connection ports 2324, 2328, 2326 and 2330 can receive connection piping and/or bleed valves. Side wall 2332 also includes mounting holes 2344, 2346, 2348 and 2350 for mounting flange 2300 to a support structure. Side wall 2334 includes mounting holes 2336, 2338, 2340 and 2342 for mounting flange 2300 to a support structure.

Figure 25:
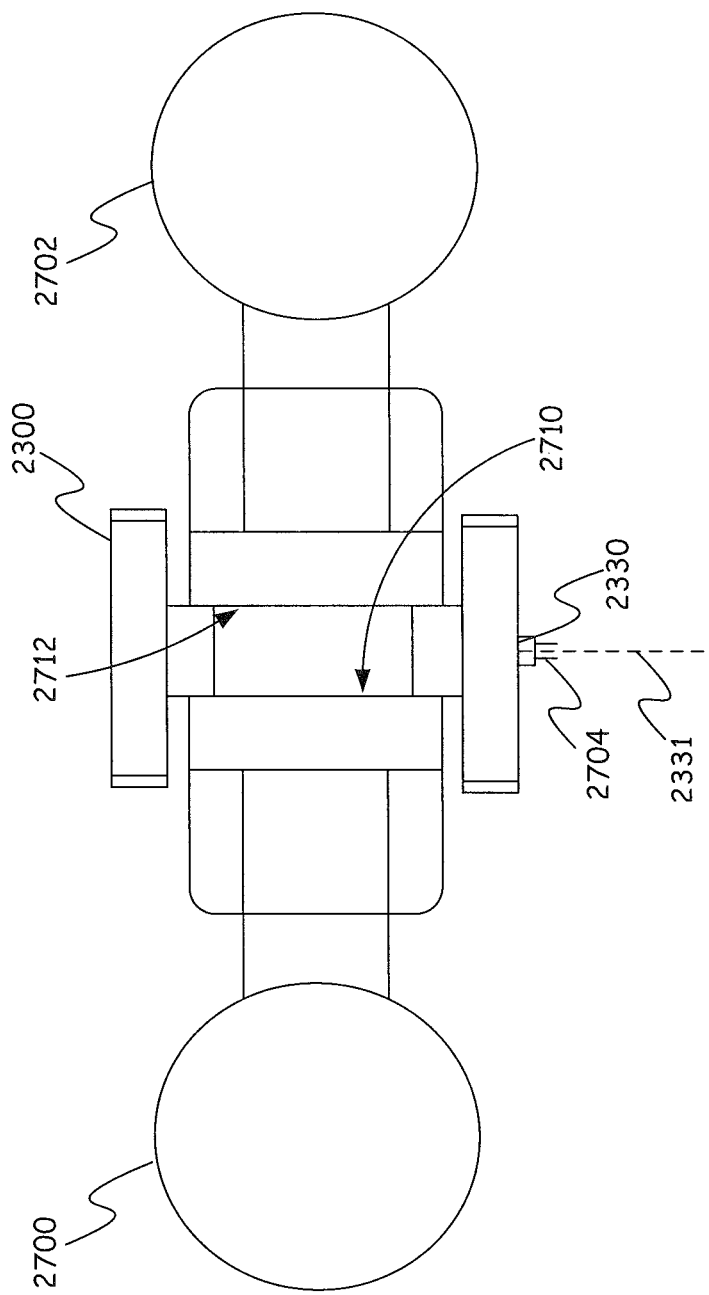
FIG. 25 is a front view of the flange of FIG. 21 with two field devices mounted thereon.
Figure 26:
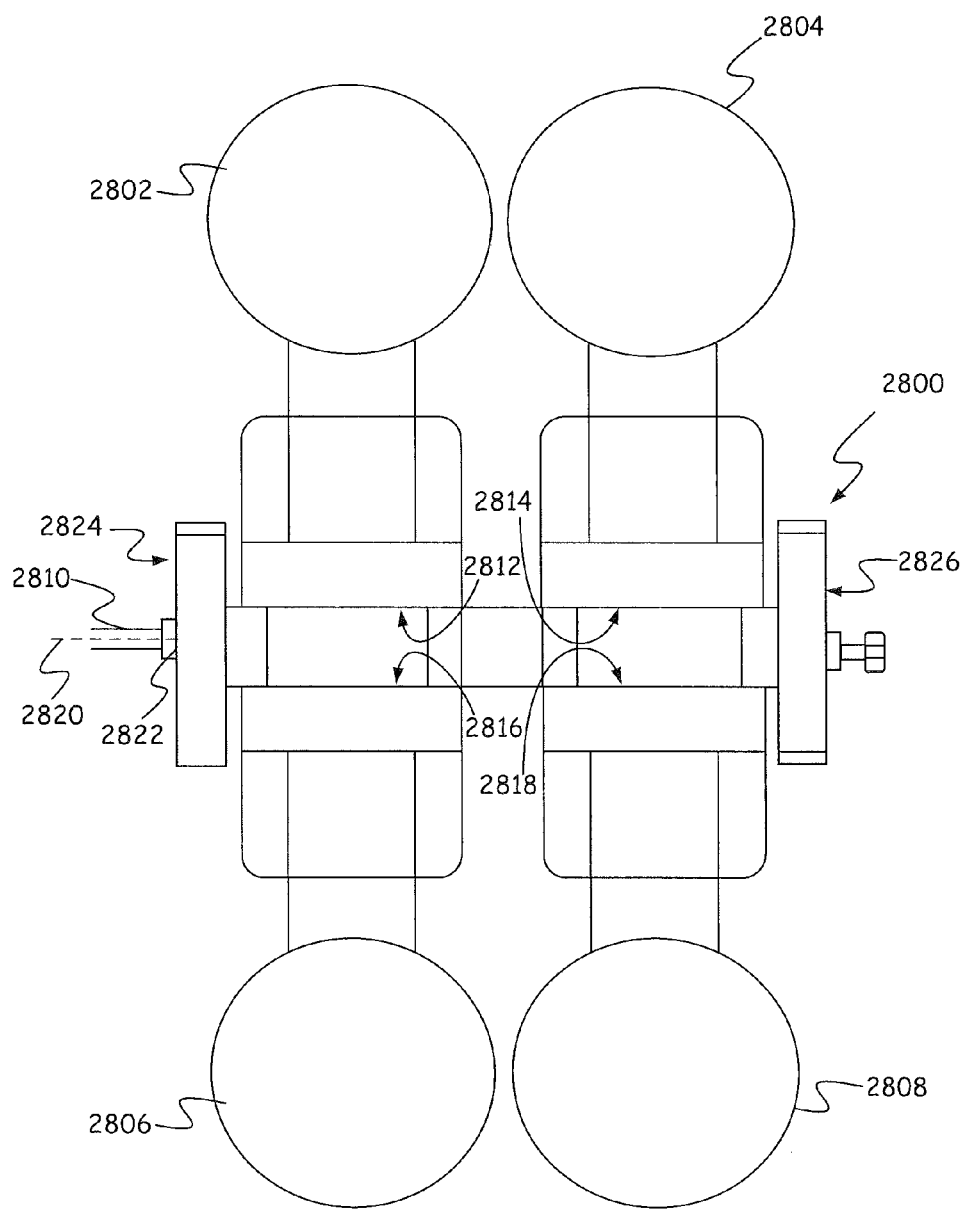
FIG. 26 is a front view of a flange in accordance with a sixth embodiment with four field devices mounted thereon.

As shown in FIG. 25, an internal chamber 2370 fluidically connects side connection ports 2324 and 2326 together and to device ports 2318 and 2320. As shown in FIG. 26, an internal chamber 2372 connects side connection ports 2328 and 2330 together and to device ports 2316 and 2322. Thus, through internal chamber 2370, field devices mounted to mounting areas 2304 and 2306 are each fluidically connected to side connection ports 2324 and 2326. In addition, through internal chamber 2372, field devices mounted on mounting areas 2304 and 2306 are fluidically connected to side connection ports 2328 and 2330.

FIG. 25 provides a front view of flange 2300 rotated 90° and supporting two field devices 2700 and 2702. In FIG. 25 connection port 2330 is connected to piping 2704 and connection port 2326 is connected to a second piping (not shown). Thus, each of field devices 2700 and 2702 are in fluidic communication with piping 2704 and the piping that is not shown. In addition, mounting surfaces 2710 and 2712 of field devices 2700 and 2702 are parallel to axes 2331 and 2327 of side connection ports 2330 and 2326.

In accordance with one embodiment, field devices 2700 and 2702 are similar and thus provide redundant measurements, which can increase safety in certain applications while maintaining accuracy by ensuring that each field device is measuring from the same location in the process conduit. In accordance with other embodiments, field device 2700 has a different range than field device 2702 or measures a different parameter than field device 2702. For example, field device 2700 can be a wide range field device and field device 2702 can be a normal range field device. The signal from the normal range field device can be used when the sensed value is in a normal range and the signal from the wide range field device can be used when the sensed value is outside of the normal range. Although two piping connections are discussed for FIG. 25, in other embodiments only a single piping connection is used and field devices 2700 and 2702 provide a gauge pressure or a temperature or both.

FIG. 26 provides a front view of a flange 2800 of a further embodiment. In FIG. 26, flange 2800 is similar to flange 2300 except that it has been expanded to include two additional mounting areas on each side of the flange and the two additional mounting areas are identical to mounting areas 2304 and 2306, respectively. Thus, flange 2800 can support four field devices 2802, 2804, 2806 and 2808, which are each in fluidic communication with piping 2810 and additional piping (not shown). In accordance with one embodiment, field devices 2802, 2804, 2806 and 2808 are similar to each other and provide four-way redundancy in their measurements. In accordance with other embodiments, one or more of field devices 2802, 2804, 2806, and 2808 has a different measurement range or measures a different parameter of the process flow. Alternatively, one or more of field devices 2802, 2804, 2806 and 2808 can provide a flow rate measurement and/or a mass flow rate measurement. The mounting surfaces 2812, 2812, 2816 and 2812 of field devices 2802, 2804, 2806, and 2818 are parallel to an axis 2820 of a side connection port 2822. In addition each mounting area on flange 2800 is between side or end 2824 and side or end 2826 of flange 2800.

Figure 27:
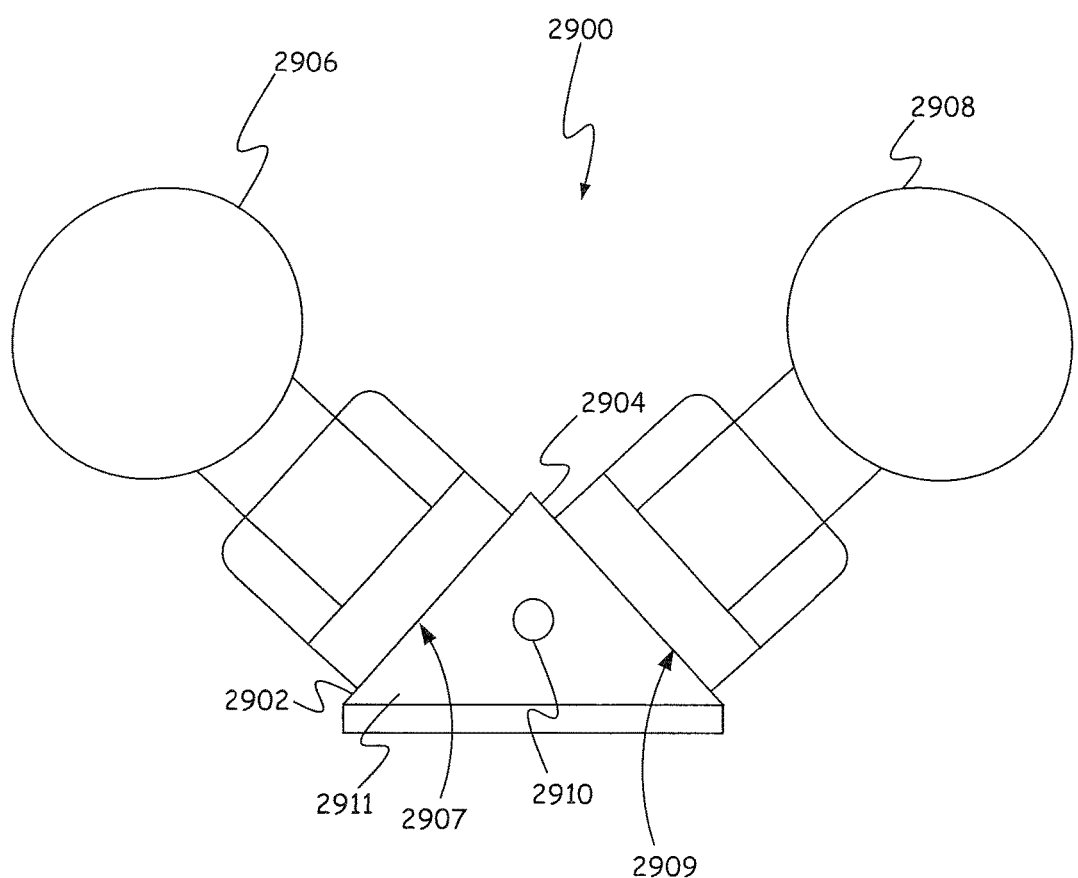
FIG. 27 is a side view of a flange in accordance with a seventh embodiment with two field devices mounted thereon.

FIG. 27 provides a side view of a flange 2900 in accordance with a further embodiment. Flange 2900 includes two angled surfaces 2902 and 2904 that each have mounting areas similar to mounting area 2304 of FIG. 21. The mounting areas on angled surfaces 2902 and 2904 are provided between side or end 2911 and an opposite side or end of flange 2900. The mounting area on angled surface 2902 supports a field device 2906 having a mounting surface 2907. The mounting area on angled surface 2904 supports a field device 2908 having a mounting surface 2909. Angled surfaces 2902 and 2904 are angled relative to each other such that they are not in the same plane and they are not on opposite sides of a plate. Flange 2900 includes a side connection port 2910 on a side 2911 and internal chambers that connect side connection port 2910 to device ports beneath each of field device 2906 and 2908. Side connection port 2910 has an axis extending out of the page that is parallel to mounting surfaces 2907 and 2909. Although a single connection port is shown, multiple connection ports may be provided in flange 2900. Further, one or more connection ports may be provided on an opposite side or end of flange 2900 from side or end 2911.

In accordance with one embodiment, field devices 2906 and 2908 are similar and thus provide redundant measurements, which can increase safety in certain applications while maintaining accuracy by ensuring that each field device is measuring from the same location in the process conduit. In accordance with other embodiments, field device 2906 has a different range than field device 2908 or measures a different parameter than field device 2908. For example, field device 2906 can be a wide range field device and field device 2908 can be a normal range field device. The signal from the normal range field device can be used when the sensed value is in a normal range and the signal from the wide range field device can be used when the sensed value is outside of the normal range. Alternatively, field device 2906 can measure a gauge pressure while field device 2908 measures a temperature.

Figure 28:
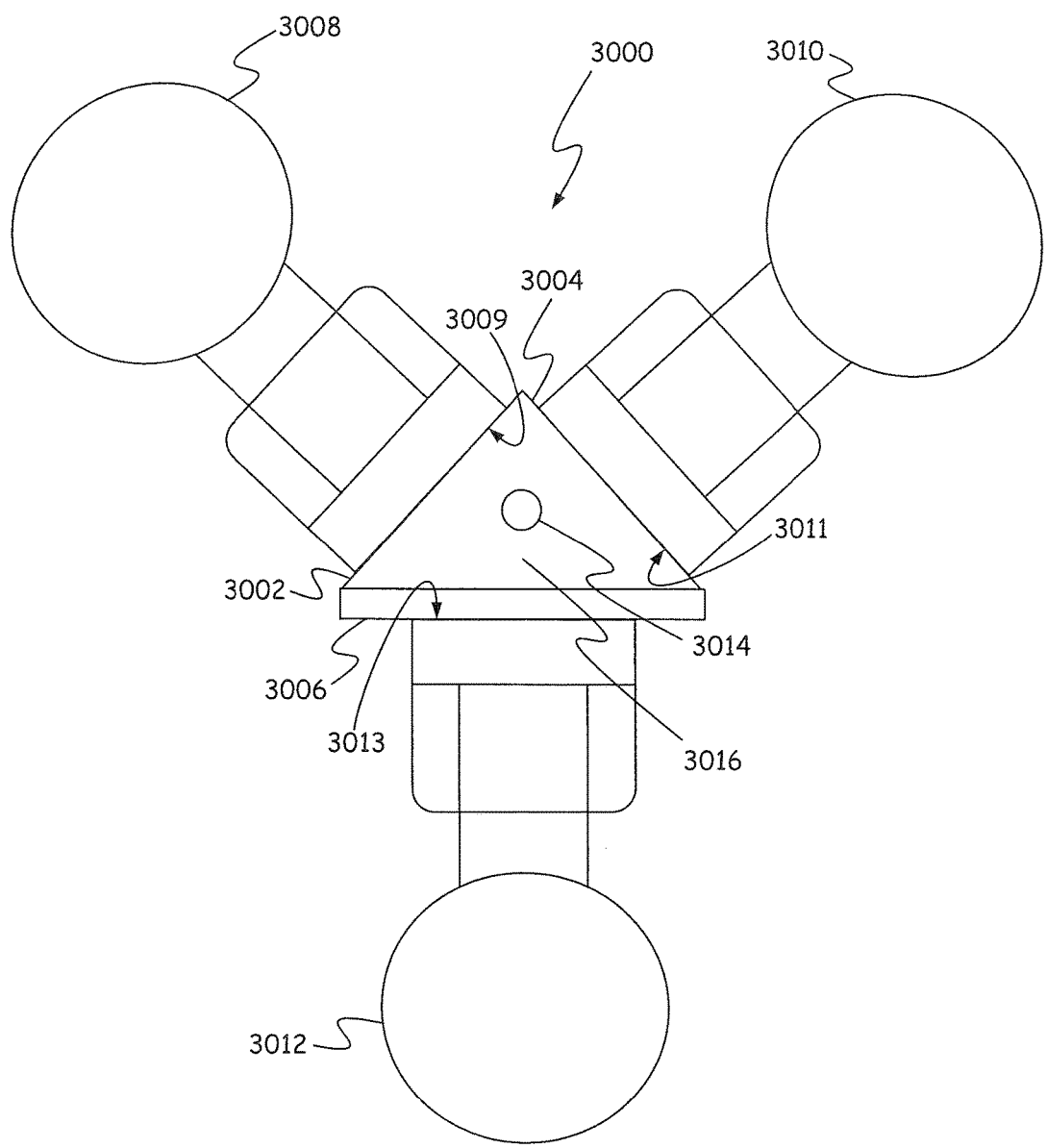
FIG. 28 is a side view of a flange in accordance with an eighth embodiment with three field devices mounted thereon.

FIG. 28 provides a side view of a flange 3000 in accordance with a still further embodiment. Flange 3000 includes three angled surfaces 3002, 3004 and 3006 that each have mounting areas identical to mounting area 2304 of FIG. 21 such that each includes four mounting holes and two device ports. Each mounting area on each angled surface 3002, 3004 and 3006 supports a separate field device 3008, 3010 and 3012 having a respective mounting surface 3009, 3011, and 3013. Each mounting area is between a side or end 3016 and an opposite side or end (not shown). Flange 3000 also includes a connection port 3014 on side 3016. Although a single connection port is shown on side 3016, multiple connection ports may be provided on side 3016 and on the opposite side of flange 3000. An axis of connection port 3014 extends out of the page and is parallel to each of mounting surfaces 3009, 3011, 3013. Each connection port is connected by an internal chamber (not shown) to at least one device port for each field device 3008, 3010 and 3012. In accordance with one embodiment, field devices 3008, 3010 and 3012 are similar and thus provide three-way redundant measurements. In other embodiments, one or more of field devices 3008, 3010 and 3012 have a different measurement range or measure a different parameter than the other field devices.

The embodiments above provide several advantages when connecting multiple field devices to a same location in a process conduit or tank. First, there are fewer connections required because each field device does not need its own connection to the piping but instead shares a connection to the piping. This helps to reduce the number of leak paths for the fluid carried by the piping. Also, the field devices are as close to each other as possible, which minimizes the fluid volume allowing for maximum performance in terms of temperature effects and time response. In addition, only one bracket is needed for mounting, making installation of the units much easier, faster and cleaner than if each field device has to be mounted separately.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A flange for process field devices, the flange comprising:
   a first end;
   a second end;
   a first mounting area for mounting a first field device between the first end and the second end, the first mounting area comprising a first device port and a third device port positioned in the first mounting area to allow fluid communication with the first field device;
   a second mounting area for mounting a second field device between the first end and the second end, the second mounting area comprising a second device port and a fourth device port positioned in the second mounting area to allow fluid communication with the second field device;
   a through hole separated from all field device mounting areas on the flange for attaching the flange to a support structure;
   a connection port that provides fluid to the flange, the connection port located on the first end the flange;
   a second connection port that provides fluid to the flange;
   an internal chamber fluidly connecting the connection port to the first device port and the second device port; and
   a second internal chamber fluidly connecting the second connection port to the third device port and the fourth device port, where the second internal chamber is not in fluid communication with the first internal chamber.

2. The flange of claim 1 further comprising a second connection port located on the second end wherein the internal chamber fluidly connects the second connection port to the first device port, the second device port and the connection port.

3. The flange of claim 1 further comprising a third connection port located on the second end and a fourth connection port located on the second end wherein the internal chamber fluidly connects the third connection port to the first device port, the second device port and the connection port and the second internal chamber fluidly connecting the fourth connection port to the second connection port, the third device port and the fourth device port.

4. The flange of claim 1 wherein the first mounting area and the second mounting area are on opposite sides of the flange.

5. The flange of claim 4 wherein the first mounting area and the second mounting area share a common mounting hole in the flange.

6. The flange of claim 1 wherein the connection port provides fluid to the flange through a connection to a remote seal.

7. A manifold for process transmitters, the manifold comprising:
   a plate comprising:
      a first internal chamber;
      a second internal chamber, separate from the first internal chamber and not in fluid communication with the first internal chamber;
      a first device port in fluid communication with the first internal chamber and a second device port in fluid communication with the second internal chamber, wherein the first and second device ports are positioned to be covered by a first process transmitter when the first process transmitter is mounted on the manifold; and
      a third device port in fluid communication with the first internal chamber and a fourth device port in fluid communication with the second internal chamber, wherein the third and fourth device ports are positioned to be covered by a second process transmitter when the second process transmitter is mounted on the manifold; and
   a wall connected to the plate for mounting the manifold to a support structure such that mounting bolts for mounting the manifold pass through the wall without entering the plate.

8. The manifold of claim 7 further comprising a first plurality of mounting holes for mounting the first process transmitter to the manifold and a second plurality of mounting holes for mounting the second process transmitter to the manifold.

9. The manifold of claim 7 wherein the first device port and the third device port are on opposite sides of the manifold.

10. The manifold of claim 9 further comprising a plurality of mounting holes wherein each mounting hole is used to mount both the first process transmitter and the second process transmitter to the manifold.

11. The manifold of claim 7 further comprising a fluid connection port, wherein the first internal chamber connects the first device port and the third device port to the fluid connection port.

12. The manifold of claim 11 further comprising a second fluid connection port, wherein the second internal chamber connects the second device port and the fourth device port to the second fluid connection port.

13. A process field device assembly, the assembly comprising:
   a flange, having a connection port with an axis wherein the connection port is in fluid communication with an internal chamber in the flange and the flange comprising a second internal chamber;
   a first process field device mounted to a top of the flange such that a diaphragm of the first process field device is in fluid communication with the internal chamber in the flange and the first process field device is further in fluid communication with the second internal chamber in the flange and the axis of the connection port extends parallel to a mounting surface of the first process field device;

a second process field device mounted to a bottom of the flange such that a diaphragm of the second process field device is in fluid communication with the internal chamber in the flange and the second process field device is further in fluid communication with the second internal chamber in the flange and the axis of the connection port extends parallel to a mounting surface of the second process field device.

14. The process field device assembly of claim 13 wherein the flange further comprises a second connection port with a second axis and in fluid communication with the second internal chamber.

15. A manifold for process transmitters, the manifold comprising:

a first internal chamber;

a second internal chamber, separate from the first internal chamber and not in fluid communication with the first internal chamber;

a first device port in fluid communication with the first internal chamber and a second device port in fluid communication with the second internal chamber, wherein the first and second device ports are positioned to be covered by a first process transmitter when the first process transmitter is mounted on the manifold and wherein the first device port is located on a first angled surface of the manifold; and a third device port in fluid communication with the first internal chamber and a fourth device port in fluid communication with the second internal chamber, wherein the third and fourth device ports are positioned to be covered by a second process transmitter when the second process transmitter is mounted on the manifold and wherein the third device port is located on a second angled surface of the manifold, and wherein the first angled surface and the second angled surface are at an angle to each other.

* * * * *